Nov. 6, 1956     E. L. MAYO     2,769,597
THERMOSTATIC VALVE WITH SOLID ACTUATOR MEMBER
Filed June 27, 1955
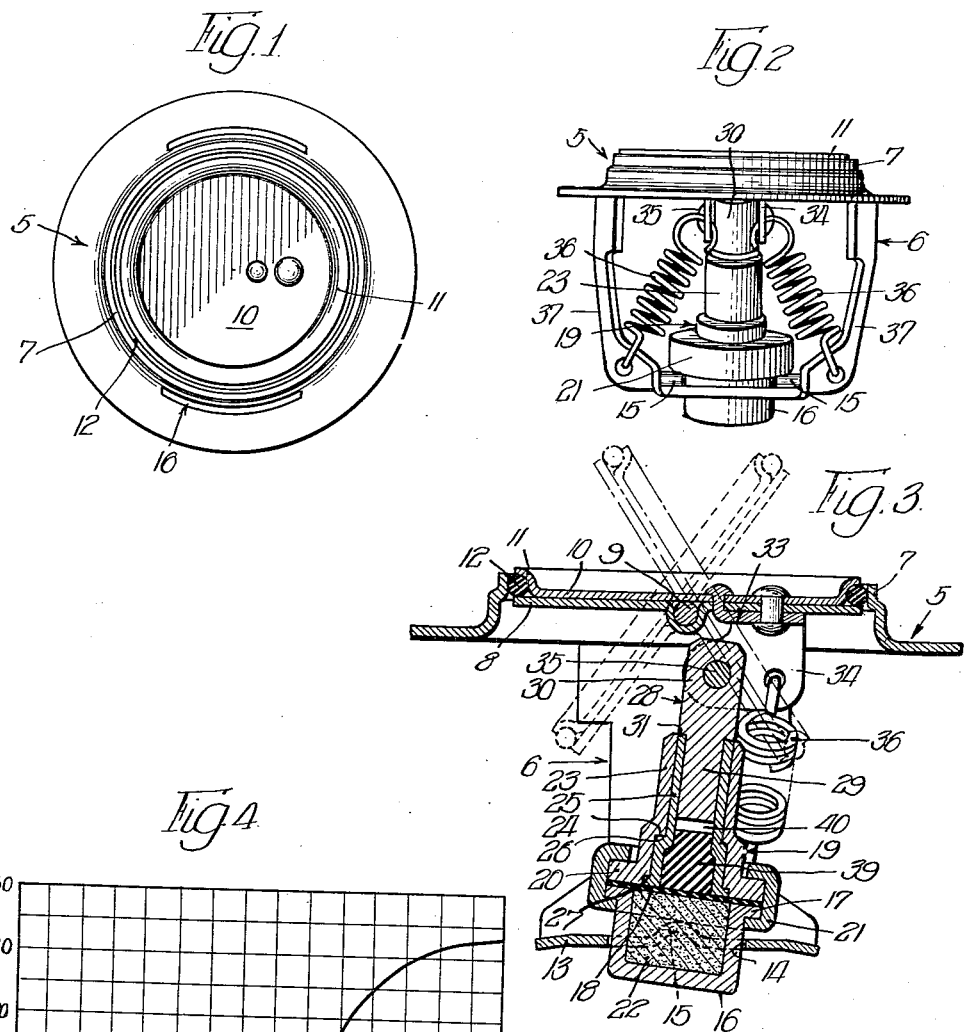
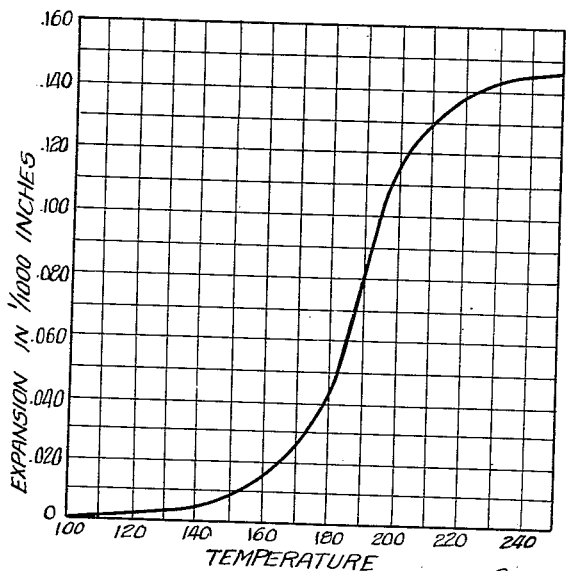
INVENTOR.
Edward L. Mayo,
BY
Brown, Jackson, Boettcher & Dienner

United States Patent Office 2,769,597
Patented Nov. 6, 1956

2,769,597

THERMOSTATIC VALVE WITH SOLID ACTUATOR MEMBER

Edward L. Mayo, Cleveland, Ohio, assignor to The Bishop & Babcock Manufacturing Company, Cleveland, Ohio, a corporation of Ohio Application June 27, 1955, Serial No. 518,129

14 Claims. (Cl. 236—34)

This invention relates to valves for use in controlling the flow of liquids, and has to do with thermostatic valves employing as the motive power agent for opening the valve a body of material, preferably normally solid, expansible and contractible responsive to temperature variations.

It is well known to provide, in unsealed internal combustion engine cooling systems, thermostatic valves for preventing flow of coolant to the radiator until the coolant reaches a predetermined high temperature, at which time the valve opens permitting flow of coolant to the radiator in the continued operation of the engine. The known valves are of two types—first, one in which the valve member has rectilineal movement and, second, one in which the valve member swings about a transverse axis, i. e. a butterfly type. In both types the valve member, when closed, seats on a seat member or means which positively limits movement of the valve member in closing direction. The valve member, in the known valves, usually is actuated by a bellows and associated spring means and fails safe, i. e. upon failure of the bellows the valve member opens or remains open to permit effective flow of coolant to the radiator and thereby guard against injurious overheating or burning of the engine.

In certain cases, the known thermostatic valves above referred to, when used in sealed cooling systems, show variation in predetermined starting temperature and are not entirely satisfactory in that respect.

It is also known, in sealed cooling systems, to provide a valve in which the valve member is urged in closing direction by spring means and is moved in opening direction by a normally solid actuating member expansible and contractible responsive to increase and decrease in temperature of the coolant. In that valve the valve member, when closed, seats against seat means which positively prevents movement of the valve member in closing direction beyond fully closed position. This valve is therefore unsatisfactory, because it remains closed upon failure and can not fail safe, even though it possesses adequate operating power to overcome the pressures encountered in a sealed cooling system.

My invention is directed to a thermostatic valve comprising a valve member movable in one direction to open position and normally movable in the opposite direction to closed position only, the valve member upon failure of the valve operating member being movable in such opposite direction beyond closed position to a second and abnormal open position so as to fail safe. More particularly I provide a thermostatic valve which retains the advantages of the known valves having a solid valve opening member while possessing the additional advantage of failing safe. To that end I provide a valve member normally movable in closing direction to closed position only and moved to open position by a normally solid operating member when the engine coolant is at a predetermined high temperature. I also provide means cooperating with the solid valve opening member for normally holding the valve member closed, when the engine coolant is at the desired predetermined low temperature, and effective for moving the valve member a further distance in normally closing direction beyond closed position to an open position, upon failure of the valve due to failure of the valve opening member. Further objects and advantages of my invention will appear from the detail description.

In the drawings:

Figure 1 is a plan view of a thermostatic valve embodying my invention;

Figure 2 is a side view of the thermostatic valve of Figure 1;

Figure 3 is a sectional view, on an enlarged scale, taken substantially on line 3—3 of Figure 1; and Figure 4 is a graph of the temperature response of the solid valve actuating member used in the valve of my invention.

The valve of my invention, in its broader aspects, may be used for various purposes, though it is particularly suitable for use in the cooling system of an automobile engine and will be described, by way of example, as used for that purpose. It comprises a seat member 5 to which is secured a substantially U-shaped depending supporting frame 6. Seat member 5 is provided with an upwardly extending seat element 7 within which is pivotally mounted a disc valve member 8 by means of a transverse pivot rod 9 suitably secured thereto and pivoted, at its ends, in element 7. A retainer plate 10 is secured to the upper face of valve member 8 concentric therewith in a suitable manner, conveniently by soldering. The plate 10 has an upwardly and outwardly inclined rim portion 11. The rim portion 11 and the valve member 8 define between them a channel which receives an O sealing ring 12 of suitable elastic material resistant to water and solutions such as are commonly used in engine cooling systems. In the normal closed position of valve member 8 the sealing ring 12 contacts seat elements 7 under appreciable pressure providing therewith a liquid tight closure. The sealing ring 12, while providing an effective seal with the seat element 7, does not interfere to objectionable extent with turning of valve member 8 in either direction about the axis of pin 9. In the normal intended use of the valve, the valve member 8 remains in its closed position until the coolant reaches a temperature of approximately 160°, at which temperature the valve member 8 turns counterclockwise, as viewed in Figure 3, to open position and continues turning in that direction so long as the temperature of the coolant increases, valve member 8 being moved to full open position when the temperature of the coolant is at approximately 180° F. Thereafter, the valve member 8 may move in either closing or opening direction as required to maintain the coolant at the desired operating temperature, approximately 180°. When the temperature of the coolant drops to approximately 158° to 160° F., due to stoppage of the engine or other cause, the valve member 8 is returned to closed position and normally remains there until the temperature of the coolant again increases, as when the engine is again started. The valve member 8 is thus turned in counterclockwise direction to open position and is turned in clockwise direction to closed position, as viewed in Figure 3, turning of valve member 8 clockwise beyond its normal closed position being prevented, under normal conditions, by means to be described presently.

The bight portion 13 of supporting frame 6 is provided with a central circular opening 14 and, at opposite sides of opening 14, with two upwardly extending ribs 15 of rounded cross section aligned diametrically of opening 14. A cylindrical casing 16 extends loosely through opening 14. At its upper end casing 16 is provided with an outwardly extending circumferential flange 17 on the upper face of which seats the outer portion of a diaphragm 18 formed of rubber or other suitable elastic material. A guide member 19 extends upwardly from casing 17 concentrically therewith and is provided with an outer circumferential base flange 20 seating upon the circumferential portion of diaphragm 18. A channel ring 21 is secured tightly about the flanges 17 and 20 and secures the casing 16 and guide member 19 together while also clamping the circumferential portion of diaphragm 18 tightly between flanges 17 and 20 providing therewith a fluid tight seal. The casing 16, closed at its upper end by the diaphragm, provides a closed housing which receives a normally solid pressure generating or actuator member 22. The member 22 normally is solid and is expansible and contractible responsive to increase and decrease in temperature. A motive power or pressure generating member well suited for the purposes of my invention may be formed of a suitable commercial wax compounded in accordance with known formulae. Preferably, though not necessarily, I use a wax which has a rather slow rate of expansion in the temperature range of from about 100° F. to 160° F., the rate of expansion increasing substantially and abruptly at about 165° F. and continuing to about 200° F., the wax fusing between 190° F. and 200° F. and the rate of expansion with further increase in temperature then rapidly decreasing. The particular wax used will depend upon requirements, as will be understood, and may be compounded accordingly by known commercial processes. In a sealed automobile cooling system, in general, the thermostatic valve should start to open at approximately 158° F. to 160° F. and should be fully open at approximately 185° F. to 190° F. Assuming that member 22 is formed of the wax stated, it remains solid at temperatures below about 190° F. The member 22 is formed under substantial pressure—approximately 1000 p. s. i.—sufficient to eliminate any voids and squeeze out any trapped air or gases, so as to produce a cylindrical solid homogeneous body or member 22 of a size, at normal room temperature, to fill completely the casing 16. The contraction of member 22 in the temperature range between approximately 100° F. and normal room temperature, about 70° F., is negligible and may be disregarded.

The guide member 19 is provided with an upwardly extending tubular neck 23 having an interior shoulder 24. A sleeve 25 fits snugly but slidably in neck 24 and is provided with an exterior shoulder 26 engaging beneath shoulder 24 of neck 23 and providing an upwardly tapering passage between the upper and the lower portions of sleeve 25. At its lower end sleeve 25 is provided with an outer circumferential base flange 27 seating on diaphragm 18 and extending into a corresponding recess in flange 20 of guide member 19. The actuator member 22 is solid at normal room temperature, about 70° F., and normally restrains sleeve 25 against downward movement relative to neck 23 of guide member 19. A cylindrical plunger 28 is slidably mounted in sleeve 25. The plunger 28 comprises a lower portion 29 fitting in sleeve 25 and on upper portion or head 30 of increased diameter, approximately the same as the interior diameter of neck 23 and slidable therein under certain conditions, as will appear more fully later. The increased diameter of head 30 of plunger 28 provides the latter with an exterior circumferential shoulder 31 which normally seats on the upper end of sleeve 25 and in conjunction therewith restrains plunger 28 against downward movement.

A U-shaped bracket 33 is suitably secured, as by riveting, to valve 8 and retainer plate 10, at the under face of the former, at one side and transversely of pivot rod 9. Head 30 of plunger 28 extends upwardly between arms 34 of bracket 33 and is pivotally connected thereto by a pivot pin 35 disposed parallel with and to one side of pivot rod 9. Two tension springs 36 are anchored at their upper ends to arms 34 of bracket 33 and at their lower ends to arms 37 of supporting frame 6 adjacent the lower ends of the latter arms. When the actuator 22 is in its solid condition, or the temperature of the coolant is below the desired opening temperature of the valve— usually approximately 158° F.— the tension springs 36 hold the valve 8 closed with shoulder 31 of plunger 28 seating on the upper end of sleeve 25, which is then restrained against downward movement. The valve 8 is then in its closed position shown in Figure 3, with the assembly comprising the plunger 28 and the casing 16 and guide member 19 inclined upward and outward as shown. In that connection, it will be noted that the channel ring 21 seats on ribs 15 for rocking movement of casing 16, opening 14 being of slightly greater diameter than casing 16 to permit rocking thereof. That permits sufficient rocking of plunger 28 to assure that the axis thereof will be maintained in alignment with the axis of pivot pin 35, thereby guarding against binding of parts, which is conducive to accuracy in operation of the valve.

A cylindrical plug 39 of suitable elastic material, such as rubber, fits in the lower portion of sleeve 25 and seats at its lower end on diaphragm 18. The upper end portion of plug 39 extends through the upwardly tapering passage between the upper and lower portions of sleeve 25 for a purpose to be described later. The plug 39 terminates a short distance below the lower end of plunger 28, when the valve 8 is closed and the parts are in their positions shown in Figure 3, providing a space 40 of appreciable height between the upper end of plug 39 and the lower end of plunger 28. As previously noted, at temperatures below the predetermined valve opening temperature the valve 8 is closed and the parts are in their positions shown in Figure 3. During warming up of the engine the temperature of the coolant increases and the actuator 22 expands. During expansion of actuator 22 the elastic plug 39 is forced upward by the diaphragm 18. Such upward movement of plug 39 is, however, ineffective, due to the provision of the space 40, until the coolant reaches the predetermined valve opening temperature of approximately 160° F. At that temperature plug 39 contacts the lower end of plunger 28. Thereafter, as the temperature of the coolant increases, actuator 22 continues to expand and plug 39 forces plunger 28 upwardly thereby turning valve 8 counter-clockwise to open it. If the temperature of the coolant continues to increase, valve 8 may be turned to its full open position, indicated in broken lines in Figure 3. If the temperature of the coolant decreases, valve 8 is turned clockwise in closing direction by the tension springs 36, under control of the actuator 22. Valve 8 is thus moved in opening and closing directions as required by temperature variations of the coolant, and when the temperature drops below the predetermined valve opening temperature, valve 8 closes and remains closed.

In the event of loss of material of the member 22, the diaphragm 18 will be free to flex downwardly within casing 16 to a material extent, such as to permit downward movement of sleeve 25, and with it plunger 28 a substantial distance beyond the position which it occupies when the valve member 8 is in its closed position. Under such conditions, the pressure generating or motive power member 22 fails and tension springs 36 then become effective for turning the valve member 8 in clockwise direction about its pivot rod 35 from its closed position to a second and abnormal open position, indicated in dot and dash lines in Figure 3, thus permitting flow through the valve of the coolant. That assures that if the valve fails it will fail safe so as to permit flow of coolant to the radiator and avoid the risk of dangerous overheating of the engine with possible serious damage.

While I have described my invention, by way of example, as used in connection with a butterfly type of valve for automobiles, it may be used with other suitable types of valves and for various other purposes. In its broader aspects my invention comprehends a body of material within a sealed chamber or casing having a movable wall, the body of material being expansible and contractible responsive to temperature variations and normally restraining the movable wall against movement inwardly of the chamber, and operating means yieldingly urged toward the chamber and normally limited in its movement in such direction by the movable wall in cooperation with the body of material, the operating means being attachable to a member to be operated thereby within normal predetermined limits, and being movable inwardly of the chamber beyond its normal limit of movement in that direction upon loss from the chamber of the material normally sealed therein. More specifically, my invention comprises a sealed chamber closed at one side by an elastic diaphragm, a guide member extending upwardly from the chamber, a sleeve fitting in the guide member restrained against relative upward movement and seating at its lower end on the diaphragm and normally restrained thereby in cooperation with the body of material within the chamber against downward movement, a plunger slidable in the sleeve having an abutment seating on the upper end of the sleeve in the fully retracted position of the plunger, and means for transmitting outward pressure of the diaphragm to the plunger, the plunger being yieldingly urged toward the chamber and movable with the sleeve inwardly thereof upon loss from the chamber of the material therein. It will be understood, from the above, that my invention is directed to the means for operating a valve or analogous member, as well as to the valve assembly as a whole.

It will be understood that changes in detail may be resorted to without departing from the field and scope of my invention, and I intend to include all such variations, as fall within the scope of the appended claims, in this application in which the preferred form only of my invention has been disclosed.

I claim:

1. In thermostatic valve means, a valve seat member, a valve member cooperating with said seat member movable in one direction to a first and normal open position and in the opposite direction to a closed position, said valve member also being movable in said opposite direction beyond said closed position to a second and abnormal open position upon failure of said valve means, means yieldingly urging said valve member in said opposite direction, a sealed casing carried by said valve seat member and having a movable wall, a body of motive power material in said casing expansible and contractible responsive to variations in temperature, a first operating member and a second operating member slidably connected and having limited movement one toward the other, said first member being restrained against outward movement away from said casing and normally restrained against inward movement toward said casing, both of said members being movable inward responsive to escape from said casing of said motive power material, operating connections between said second operating member and said valve member for moving the latter in opening direction in the outward movement of said second member, and lost motion means for transmitting outward pressure from said movable wall to said second member.

2. In thermostatic valve means, a valve seat member, a valve member cooperating with said seat member movable in one direction to a first and normal open position and in the opposite direction to a closed position, said valve member also being movable in said opposite direction beyond said closed position to a second and abnormal open position upon failure of said valve means, means yieldingly urging said valve member in said opposite direction, a sealed casing carried by said valve seat member and having a movable wall, a motive power member comprising a body of material in said casing expansible and contractible responsive to variations in temperature, a first operating member restrained against outward movement away from said casing and normally restrained against inward movement toward said casing by said movable wall in cooperation with said motive power member and movable inward responsive to escape from said casing of the material of said motive power member, a second operating member slidably connected to said first operating member and having operating connection to said valve member for moving the latter in opening direction during movement of said second member outwardly of said first member, means limiting movement of said second member inwardly of said first member, said second member being movable inwardly with said first member responsive to escape from said casing of the material of said motive power member, and lost motion means for transmitting outward pressure from said movable wall to said second member.

3. In thermostatic valve means, a valve seat member, a valve member cooperating with said seat member movable in one direction to a first and normal open position and in the opposite direction to a closed position, said valve member also being movable in said opposite direction beyond said closed position to a second and abnormal open position upon failure of said valve means, means yieldingly urging said valve member in said opposite direction, a sealed casing carried by said valve seat member and having a movable wall, a motive power member comprising a normally solid body of material in said casing expansible and contractible responsive to variations in temperature and fusible in the opening temperature range of said valve member, a first operating member restrained against outward movement away from said casing and normally restrained against inward movement toward said casing by said movable wall in cooperation with said motive power member and movable inward responsive to escape from said casing of the material of said motive power member, a second operating member slidably connected to said first operating member and having operating connection to said valve member for moving the latter in opening direction during movement of said second member outwardly of said first member, means limiting movement of said second member inwardly of said first member, said second member being movable inwardly with said first member responsive to escape from said casing of the material of said motive power member, and lost motion means for transmitting outward pressure from said movable wall to said second member.

4. In thermostatic valve means, a valve seat member, a valve member cooperating with said seat member movable in one direction to a first and normal open position and in the opposite direction to a closed position, said valve member also being movable in said opposite direction beyond said closed position to a second and abnormal open position upon failure of said valve means, means yieldingly urging said valve member in said opposite direction, a sealed casing carried by said valve seat member and having a movable wall, a motive power member comprising a normally solid body of material in said casing expansible and contractible responsive to variations in temperature, a tubular guide member fixed to said casing and overlying said movable wall, a sleeve in said guide member restrained against outward movement and normally restrained against inward movement by said movable wall in cooperation with said motive power member, said sleeve being movable inwardly of said guide member responsive to escape from said casing of the material of said motive power member, a plunger slidable in said sleeve extending outwardly thereof and having operating connection to said valve member for moving the latter in opening direction during outward movement of said plunger, the latter having an abutment limiting inward movement thereof in said sleeve and being adapted to move inwardly with said sleeve responsive to escape from said casing of the material of said motive power member, and lost motion means for transmitting outward pressure from said movable wall to said plunger.

5. In thermostatic valve means, a valve seat member, a valve member cooperating with said seat member movable in one direction to a first and normal open position and in the opposite direction to a closed position, said valve member also being movable in said opposite direction beyond said closed position to a second and abnormal open position upon failure of said valve means, means yieldingly urging said valve member in said opposite direction, a sealed casing carried by said valve seat member and having a movable wall, a motive power member comprising a normally solid body of material in said casing expansible and contractible responsive to variations in temperature, a tubular guide member fixed to said casing and overlying said movable wall, a sleeve in said guide member restrained against outward movement and seating at its inner end on said movable wall and normally restrained by the latter in cooperation with said motive power member against inward movement, said sleeve being movable inwardly of said guide member responsive to escape from said casing of the material of said motive power member, a plunger slidable in said sleeve extending outwardly thereof and having operating connection to said valve member for moving the latter in opening direction during outward movement of said plunger, the latter having an abutment limiting inward movement thereof in said sleeve and being adapted to move inwardly with said sleeve responsive to escape from said casing of the material of said motive power member, and lost motion means for transmitting outward pressure from said movable wall to said plunger.

6. In thermostatic valve means, a valve seat member, a valve member cooperating with said seat member movable in one direction to a first and normal open position and in the opposite direction to a closed position, said valve member also being movable in said opposite direction beyond said closed position to a second and abnormal open position upon failure of said valve means, means yieldingly urging said valve member in said opposite direction, a casing carried by said valve seat member and underlying said valve member, an elastic diaphragm overlying and closing the top of said casing, a tubular guide member secured to said casing and seating on the circumferential portion of said diaphragm providing therewith a sealed top closure for said casing, a motive power member comprising a normally solid body of material restraining said diaphragm against movement inwardly of said casing and expansible and contractible responsive to variations in temperature, a sleeve in said guide member restrained against outward movement and seating at its inner end on said diaphragm and restrained thereby in cooperation with said motive power member against inward movement, said sleeve being movable inwardly of said guide member responsive to escape from said casing of the material of said motive power member, a plunger slidable in said sleeve extending outwardly thereof and having operating connection to said valve member for moving the latter in opening direction during outward movement of said plunger, the latter having an abutment limiting inward movement thereof in said sleeve and being adapted to move inwardly with said sleeve responsive to escape from said casing of the material of said motive power member, and lost motion means for transmitting outward pressure from said movable wall to said plunger.

7. In thermostatic valve means, a valve seat member, a valve member cooperating with said seat member movable in one direction to a first and normal open position and in the opposite direction to a closed position, said valve member also being movable in said opposite direction beyond said closed position to a second and abnormal open position upon failure of said valve means, means yieldingly urging said valve member in said opposite direction, a casing carried by said valve seat member and underlying said valve member, an elastic diaphraghm overlying and closing the top of said casing, a tubular guide member secured to said casing and seating on the circumferential portion of said diaphragm providing therewith a sealed top closure for said casing, a motive power member comprising a normally solid body of material restraining said diaphragm against movement inwardly of said casing and expansible and contractible responsive to variations in temperature, a sleeve in said guide member restrained against outward movement and seating at its inner end on said diaphragm and restrained thereby in cooperation with said motive power member against inward movement, said sleeve being movable inwardly of said guide member responsive to escape from said casing of the material of said motive power member, a plunger slidable in said sleeve extending outwardly thereof and having operating connection to said valve member for moving the latter in opening direction during outward movement of said plunger, the latter having an abutment limiting inward movement thereof in said sleeve and being adapted to move inwardly with said sleeve responsive to escape from said casing of the material of said motive power member, and a pressure transmitting elastic plug mounted in the inner end of said sleeve in cooperating relation to said diaphragm, the outer end of said plug normally being spaced from the inner end of said plunger providing lost motion pressure transmission means between said diaphragm and plunger.

8. In thermostatic valve means, a valve seat member, a valve member cooperating with said seat member and pivoted on a transverse axis for turning movement in one direction to a first and normal open position and in the opposite direction to a closed position, said valve member also being movable in said opposite direction beyond said closed position to a second and abnormal open position upon failure of said valve means, means yieldingly urging said valve member in said opposite direction, a sealed casing carried by said valve seat member and having a movable wall, a body of motive power material in said casing expansible and contractible responsive to variations in temperature, a first operating member and a second operating member slidably connected and having limited rectilineal movement one toward the other, said first member being restrained against outward movement away from said casing and normally restrained against inward movement toward said casing, both of said members being movable inward responsive to escape from said casing of said motive power material, said second operating member having its outer end pivotally connected to said valve member on an axis parallel with and disposed to one side of the pivot axis of said valve member for moving the latter in opening direction in the outward movement of said second member, and lost motion means for transmitting outward pressure from said movable wall to said second member.

9. In thermostatic valve means, a valve seat member, a valve member cooperating with said seat member and pivoted on a transverse axis for turning movement in one direction to a first and normal open position and in the opposite direction to a closed position, said valve member also being movable in said opposite direction beyond said closed position to a second and abnormal open position upon failure of said valve means, means yieldingly urging said valve member in said opposite direction, a substantially U-shaped frame secured to and depending from said valve seat member, a sealed casing rockably mounted in said frame and having a movable wall, a body of motive power material in said casing expansible and contractible responsive to variations in temperature, a first operating member and a second operating member slidably connected and having limited rectilineal movement one toward the other, said first member being restrained against outward movement away from said casing and normally restrained against inward movement toward said casing, both of said members being movable inward responsive to escape from said casing of said motive power material, said second operating member having its outer end pivotally connected to said valve member on an axis parallel with and disposed to one side of the pivot axis of said valve member for moving the latter in opening direction in the outward movement of said second member, and lost motion means for transmitting outward pressure from said movable wall to said second member.

10. In means for operating thermostatic valves and analogous devices, a sealed casing mounted for rocking movement about a transverse axis and having a movable flat wall substantially parallel with said axis, a body of motive power material in said casing expansible and contractible responsive to variations in temperature, a first operating member seating on said movable wall and normally restrained thereby in cooperation with said body of material against movement inward of said casing and being restrained against outward movement away from said casing, a second operating member slidable in said first member yieldingly urged inward thereof and having limited movement inward of said first member, and means for transmitting to said second member outward pressure of said movable wall incident to expansion of said body of material due to increase in temperature, said first and second members being movable inward of said casing responsive to loss therefrom of the material of said body of material.

11. In means for operating thermostatic valves and analogous devices, a sealed casing mounted for rocking movement about a transverse axis and having a movable wall substantially parallel with said axis, a body of motive power material in said casing expansible and contractible responsive to variations in temperature, a first operating member seating on said movable wall and normally restrained thereby in cooperation with said body of material against movement inward of said casing and being restrained against radial movement relative to said casing and against outward movement away from said casing, a second operating member slidable in said first member yieldingly urged inward thereof and having limited movement inward of said first member, and lost motion means for transmitting to said second member outward pressure of said movable wall incident to expansion of said body of material due to increase in temperature, said first and second members being movable inward of said casing responsive to loss therefrom of the material of said body of material.

12. In means for operating thermostatic valves and analogous devices, a sealed casing having a substantially flat movable wall, a guide member mounted on said casing extending outwardly from said movable wall substantially perpendicular thereto, a body of material within said casing expansible and contractible responsive to temperature variations, a sleeve in said guide member restrained thereby against radial movement relative to said casing and against relative outward movement and seating at its inner end on said movable wall and normally restrained by the latter in cooperation with said body of material against inward movement, a plunger slidable in said sleeve yieldingly urged inward thereof, said plunger and sleeve having cooperating means limiting movement of said plunger inward of said sleeve, and means effective for transmitting to said plunger outward pressure of said movable wall incident to expansion of said body of material due to increase in temperature, said plunger and sleeve being movable inward of said casing responsive to loss therefrom of the material of said body of material.

13. In means for operating thermostatic valves and analogous devices, a sealed casing closed at one side by a substantially flat elastic diaphragm, a guide member mounted on said casing extending outwardly from said movable wall substantially perpendicular thereto, a body of material within said casing expansible and contractible responsive to temperature variations, a sleeve in said guide member restrained thereby against radial movement relative to said casing and restrained against relative outward movement and seating at its inner end on said diaphragm and normally restrained by the latter in cooperation with said body of material against inward movement, a plunger slidable in said sleeve yieldingly urged inward thereof, said plunger and sleeve having cooperating means limiting movement of said plunger inward of said sleeve, and lost motion means effective for transmitting to said plunger outward pressure of said diaphragm incident to expansion of said body of material due to increase in temperature, said plunger and sleeve being movable inward of said casing responsive to loss therefrom of the material of said body of material.

14. In means for operating thermostatic valves and analogous devices, a sealed casing having a movable substantially flat wall, a guide member mounted on said casing extending outwardly from said movable wall substantially perpendicular thereto, a body of material within said casing expansible and contractible responsive to temperature variations, a sleeve mounted in said guide member for rectilineal movement and restrained thereby against radial movement relative to said casing and against relative outward movement and seating at its inner end on said movable wall and normally restrained by the latter in cooperation with said body of material against inward movement, a plunger slidable in said sleeve yieldingly urged inward thereof, said plunger having a shoulder disposed to contact the outer end of said sleeve and limit relative movement of said plunger inward of said sleeve, the inner end of said plunger when in its innermost position in said sleeve being spaced from said movable wall, and a pressure transmitting member in said sleeve between the inner end of said plunger and said movable wall and normally of less extent lengthwise of said sleeve than the distance between said movable wall and the inner end of said plunger when the latter is in its innermost position in said sleeve, said plunger and sleeve and pressure transmitting member being movable inward of said casing responsive to loss therefrom of the material of said body of material.

References Cited in the file of this patent

UNITED STATES PATENTS

| | | |
|---|---|---|
| 1,477,277 | Milker | Dec. 11, 1923 |
| 1,752,116 | Smith | Mar. 25, 1930 |
| 2,208,149 | Vernet | July 16, 1940 |
| 2,385,510 | Harwood | Sept. 25, 1945 |
| 2,433,221 | Huber | Dec. 23, 1947 |